Patented Sept. 10, 1935

2,014,310

UNITED STATES PATENT OFFICE 2,014,310

ESTERS OF 2-BUTYLOCTANOL

Thomas F. Carruthers, South Charleston, W. Va., assignor to Carbide and Carbon Chemicals Corporation, a corporation of New York No Drawing. Application May 11, 1934, Serial No. 725,081

12 Claims. (Cl. 260—103)

The invention relates to new compositions of matter comprising esters of 2-butyloctanol. It has especial reference to those esters formed by the reaction of 2-butyloctanol with carboxylic acids.

These esters are high boiling liquids having a solvent power for various natural and artificial gums and resins commonly used in lacquers and other protective coating compositions. Characterized by a low vapor pressure under atmospheric conditions, insolubility in water, and other desirable properties, the esters are especially suitable as plasticizing agents in lacquers, varnishes and the like.

The new compounds may be prepared by refluxing 2-butyloctanol with a carboxylic acid or its anhydride. Continuous removal of water, formed during the reaction, and the presence of catalytic proportions of sulfuric acid, or other catalyst, are also necessary to promote a complete reaction.

As illustrative of my invention the following examples are given:

Example I

A mixture of 196 grams of 2-butyloctanol and 74 grams of phthalic anhydride was heated under a reflux column in the presence of 0.2% of sulfuric acid as a catalyst. Benzene was employed in the usual manner as a water removing agent. After completion of the reaction, the mixture was neutralized by stirring with aqueous potassium hydroxide, washed with water, and dried with silica gel. The resulting ester was a viscous liquid of a faint odor, having a specific gravity of 0.933 at 20°/20° C. Its equivalent weight as determined from the saponification value, and its molecular weight, indicated the product di-2-butyloctyl phthalate.

Example II

A mixture of 319 grams of 2-butyloctanol and 90 grams of acetic acid was refluxed in the presence of 0.2% sulfuric acid as a catalyst. Benzene was used to remove water, and after completion of the reaction, the mixture was neutralized by stirring with an aqueous solution of soda ash, and then washed with water. Distillation under reduced pressure gave a liquid product with a faint pleasant odor, having a boiling point of 121° C. at 7.5 mm. pressure, and a specific gravity of 0.865 at 20°/20° C. Equivalent weight as determined from the saponification value, and other properties, indicated the product 2-butyloctyl acetate.

Example III

A mixture of 210 grams of 2-butyloctanol and 59 grams of succinic acid was heated under a reflux column in the presence of 0.2% of sulfuric acid as a catalyst. The water was removed from the system with benzene, and after completion of the reaction, the mixture was neutralized by stirring with soda ash solution. It was then washed several times with water, and distilled under reduced pressure. The high temperature necessary for the distillation caused some decomposition, so the low boiling materials were removed, and the desired product remained as residue. This product was an odorless, oily liquid, insoluble in water, which has a specific gravity of 0.906 at 20°/20° C. The equivalent weight, as determined from the saponification value, indicated the product di-2-butyloctyl succinate.

The examples given are representative of many other 2-butyloctanol esters within the scope of this invention, which is intended to include any esters formed by the reaction of this alcohol with aliphatic or aromatic monocarboxylic or polycarboxylic acids, or the anhydrides of such acids. With acids of more than one carboxylic group, it may be desirable to only partially esterify with 2-butyloctanol, and react on the residual carboxyl groups with another aliphatic alcohol, in which case a substantially neutral mixed ester may be obtained.

The invention should not be limited other than as defined in the appended claims.

I claim:

1. As chemical compounds, carboxylic acid esters of 2-butyloctanol.
2. As chemical compounds, aliphatic monocarboxylic acid esters of 2-butyloctanol.
3. As chemical compounds, aliphatic dicarboxylic acid esters of 2-butyloctanol.
4. As chemical compounds, aromatic dicarboxylic acid esters of 2-butyloctanol.
5. As a chemical compound, an acetic acid ester of 2-butyloctanol.
6. As a chemical compound, a phthalic acid ester of 2-butyloctanol.
7. As a chemical compound, a succinic acid ester of 2-butyloctanol.
8. As a chemical compound, 2-butyloctyl acetate.
9. As a chemical compound, di-2-butyloctyl phthalate.
10. As a chemical compound, di-2-butyloctyl succinate.
11. A process for making carboxylic acid esters, which comprises reacting the carboxylic acid with 2-butyloctanol in the presence of catalytic proportions of sulfuric acid.
12. A process for making dicarboxylic acid esters, which comprises reacting the dicarboxylic acid with 2-butyloctanol in the presence of catalytic proportions of sulfuric acid, whereby at least one carboxyl hydrogen is replaced by a 2-butyloctanol group.

THOMAS F. CARRUTHERS.